United States Patent
Sykula et al.

(10) Patent No.: US 10,946,838 B2
(45) Date of Patent: Mar. 16, 2021

(54) CLEANING APPARATUS FOR SENSOR

(71) Applicants: Ford Global Technologies, LLC, Dearborn, MI (US); Valeo North America, Inc., Auburn Hills, MI (US)

(72) Inventors: Andre Sykula, Sterling Heights, MI (US); Venkatesh Krishnan, Canton, MI (US); Segundo Baldovino, Novi, MI (US); Michael Whitney, Auburn Hills, MI (US); David Franco, Issoire (FR); Maxime Baudouin, Issoire (FR); Xavier Bousset, Issoire (FR); William Terrasse, Issoire (FR); Theophile Jullien, Issoire (FR); Geoffroy Duplaix, Issoire (FR)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 16/360,092

(22) Filed: Mar. 21, 2019

(65) Prior Publication Data
US 2020/0298804 A1    Sep. 24, 2020

(51) Int. Cl.
*B60S 1/66* (2006.01)
*B08B 3/02* (2006.01)
(Continued)

(52) U.S. Cl.
CPC .................. *B60S 1/66* (2013.01); *B08B 3/02* (2013.01); *G01S 7/497* (2013.01); *G01S 17/931* (2020.01); *G01S 2007/4977* (2013.01)

(58) Field of Classification Search
CPC .... B60S 1/56; B60S 1/54; B60S 1/544; B60S 1/52; B60S 1/487; B60S 1/48; B60S 1/46; B60S 1/0848; B60S 1/0486; B60S 1/0844; B60S 1/58; B60S 1/606; B60S 1/62; B60S 1/481; B60S 1/66; B60R 1/0602;
(Continued)

(56) References Cited

U.S. PATENT DOCUMENTS

| 4,340,366 | A | * | 7/1982 | Heil | ........................ | A61C 1/052 |
| | | | | | | 239/318 |
| 4,635,666 | A | * | 1/1987 | Daley | ...................... | H05K 3/26 |
| | | | | | | 134/172 |

(Continued)

FOREIGN PATENT DOCUMENTS

| CN | 109013133 A | * | 12/2018 |
| WO | 2013121067 A1 | | 8/2013 |
| WO | 2018041099 A1 | | 3/2018 |

*Primary Examiner* — John Fitzgerald
*Assistant Examiner* — Truong D Phan
(74) *Attorney, Agent, or Firm* — Frank A. MacKenzie; Bejin Bieneman PLC

(57) ABSTRACT

A sensor apparatus includes a cylindrical sensor window defining an axis, and a tubular annular member fixed relative to the sensor window and substantially centered around the axis. The annular member includes a plurality of first nozzles and second nozzles arranged in an alternating pattern around the annular member. The first nozzles each have a direction of discharge in a radially inward and axial direction forming a first angle with the axis. The second nozzles each have a direction of discharge in a radially inward and axial direction forming a second angle with the axis, and the second angle is different than the first angle.

20 Claims, 4 Drawing Sheets

(51) Int. Cl.
  *G01S 7/497* (2006.01)
  *G01S 17/931* (2020.01)

(58) Field of Classification Search
  CPC .............. G01S 7/4811; G01S 17/931; G01S 2007/4977; G01S 7/4813; B08B 3/02; F28F 3/022; G02B 27/0006
  See application file for complete search history.

(56) References Cited

U.S. PATENT DOCUMENTS

| | | | | |
|---|---|---|---|---|
| 6,076,746 | A * | 6/2000 | Kantor | B05B 3/16 239/222.17 |
| 7,025,663 | B2 * | 4/2006 | Kim | B08B 3/02 451/285 |
| 7,448,992 | B2 * | 11/2008 | Grimwood | B04B 1/20 210/380.3 |
| 9,969,363 | B1 * | 5/2018 | Wachter | G01S 17/931 |
| 2004/0231575 | A1 * | 11/2004 | Wilkerson | A01C 7/06 111/127 |
| 2006/0068696 | A1 | 3/2006 | Ashford et al. | |
| 2006/0150899 | A1 * | 7/2006 | Han | B05B 1/14 118/300 |
| 2013/0048036 | A1 * | 2/2013 | Jonas | B60S 1/0848 134/167 R |
| 2013/0298948 | A1 * | 11/2013 | Company | C11D 1/75 134/34 |
| 2017/0036647 | A1 * | 2/2017 | Zhao | B08B 3/02 |
| 2017/0182980 | A1 * | 6/2017 | Davies | B60S 1/54 |
| 2018/0015907 | A1 * | 1/2018 | Rice | B60S 1/52 |
| 2018/0015908 | A1 * | 1/2018 | Rice | G05D 1/0088 |
| 2018/0081260 | A1 | 3/2018 | Karasik | |
| 2018/0134258 | A1 * | 5/2018 | Ekola | B60S 1/52 |
| 2018/0272997 | A1 * | 9/2018 | Swain | G01S 7/4811 |
| 2019/0184942 | A1 * | 6/2019 | Vaishnav | B60S 1/62 |
| 2019/0202411 | A1 * | 7/2019 | Zhao | B08B 5/02 |
| 2019/0314865 | A1 * | 10/2019 | Sevak | B08B 5/02 |
| 2020/0180567 | A1 * | 6/2020 | Sakai | B60S 1/60 |

* cited by examiner

CLEANING APPARATUS FOR SENSOR

BACKGROUND

Autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
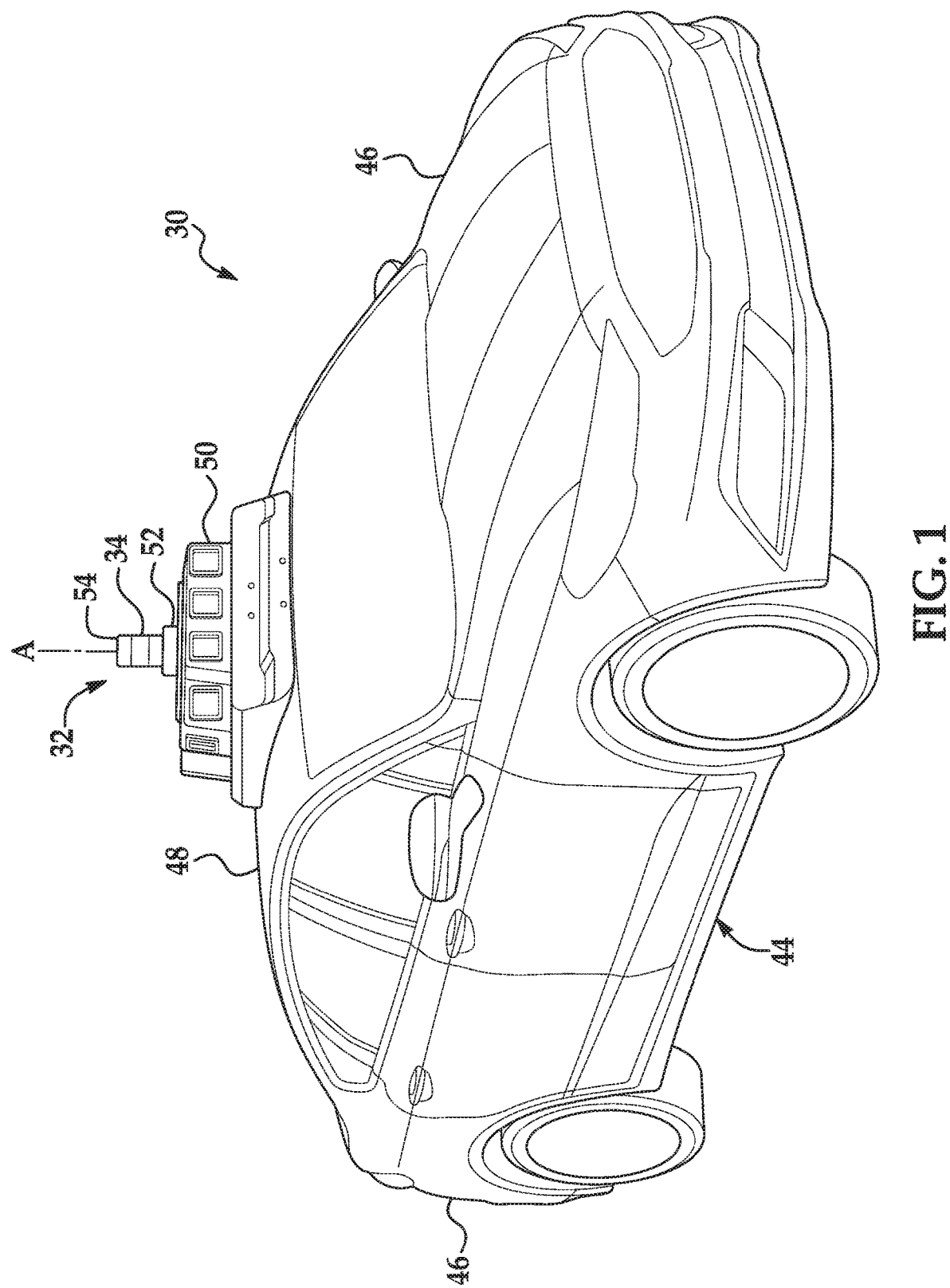
FIG. 1 is a perspective view of an example vehicle.

A sensor apparatus includes a cylindrical sensor window defining an axis, and a tubular annular member fixed relative to the sensor window and substantially centered around the axis. The annular member includes a plurality of first nozzles and second nozzles arranged in an alternating pattern around the annular member. The first nozzles each have a direction of discharge in a radially inward and axial direction forming a first angle with the axis, and the second nozzles each have a direction of discharge in a radially inward and axial direction forming a second angle with the axis, the second angle being different than the first angle.

The annular member may be spaced from the sensor window along the axis.

The first and second nozzles may be substantially evenly spaced around the annular member.

The annular member may be radially spaced from the sensor window. The first and second nozzles may be liquid nozzles, and the sensor apparatus may further include air nozzles positioned to discharge between the annular member and the sensor window. The air nozzles may be oriented to discharge in a direction parallel to the axis.

The first and second nozzles may be shaped to spray fluid in a flat-fan pattern.

The first and second nozzles may each include a flat deflection surface and an outlet directed at the respective deflection surface. The deflection surfaces of the first nozzles may each define the first angle with the axis, and the deflection surfaces of the second nozzles may each define the second angle with the axis.

The sensor apparatus may further include a sensor housing to which the sensor window is mounted, and a base to which the sensor housing and the annular member are mounted.

The annular member may include a first cavity fluidly connected to a first set of the first and second nozzles, and a second cavity fluidly connected to a second set of the first and second nozzles. The first cavity and the second cavity may be fluidly isolated from each other.

The first cavity may be elongated along a semicircular shape around the axis extending through a first half of the annular member, and the second cavity may be elongated along a semicircular shape around the axis extending through a second half of the annular member that is non-overlapping with the first half.

The first set of the first and second nozzles may include a first half of the first nozzles and a first half of the second nozzles, and the second set of the first and second nozzles may include a second half of the first nozzles and a second half of the second nozzles.

The sensor apparatus may further include a first inlet fluidly connected to the first cavity and a second inlet fluidly connected to the second cavity. The first cavity and the second cavity may each extend from first ends adjacent to each other to second ends adjacent to each other, and the first inlet may be located at the first end of the first cavity, and the second inlet may be located at the first end of the second cavity.

The plurality of first nozzles may include four first nozzles, and the plurality of second nozzles may include four second nozzles.

A sensor apparatus 32 for a vehicle 30 includes a cylindrical sensor window 34 defining an axis A, and a tubular annular member 36 fixed relative to the sensor window 34 and substantially centered around the axis A. The annular member 36 includes a plurality of first nozzles 38 and second nozzles 40 arranged in an alternating pattern around the annular member 36. The first nozzles 38 each have a direction of discharge in a radially inward and axial direction forming a first angle $\theta$ with the axis A. The second nozzles 40 each have a direction of discharge in a radially inward and axial direction forming a second angle $\varphi$ with the axis A, and the second angle $\varphi$ is different than the first angle $\theta$.

The sensor apparatus 32 provides good coverage when cleaning the sensor window 34. The different first angle $\theta$ and second angle $\varphi$ provide cleaning coverage along a height of the sensor window 34. The sensor apparatus 32 has a robust design without moving parts for distributing fluid from the first nozzles 38 and second nozzles 40; i.e., the annular member 36, including the first nozzles 38 and second nozzles 40, has no moving parts. The sensor apparatus 32 uses fluid for cleaning in an efficient manner.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A vehicle computer can be programmed to operate the vehicle 30 independently of the intervention of a human driver, completely or to a lesser degree. The vehicle computer may be programmed to operate the propulsion, brake system, steering, and/or other vehicle systems based on data received from a sensor 42, as well as other sensors. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 30 includes a body 44. The vehicle 30 may be of a unibody construction, in which a frame and the body 44 of the vehicle 30 are a single component. The vehicle 30 may, alternatively, be of a body-on-frame construction, in which the frame supports the body 44 that is a separate component from the frame. The frame and the body 44 may be formed of any suitable material, for example, steel, aluminum, etc. The body 44 includes body panels 46, 48 partially defining an exterior of the vehicle 30. The body panels 46, 48 may present a class-A surface, e.g., a finished surface exposed to view by a customer and free of unaesthetic blemishes and defects. The body panels 46, 48 include, e.g., a roof 48, etc.

A pod 50 for supporting the sensor 42 is attachable to the vehicle 30, e.g., to one of the body panels 46, 48 of the vehicle 30, e.g., the roof 48. For example, the pod 50 may be shaped to be attachable to the roof 48, e.g., may have a shape matching or following a contour of the roof 48. The pod 50 may be attached to the roof 48, which can provide the sensor 42 with an unobstructed field of view of an area around the vehicle 30. The pod 50 may be formed of, e.g., plastic or metal.

Figure 2:
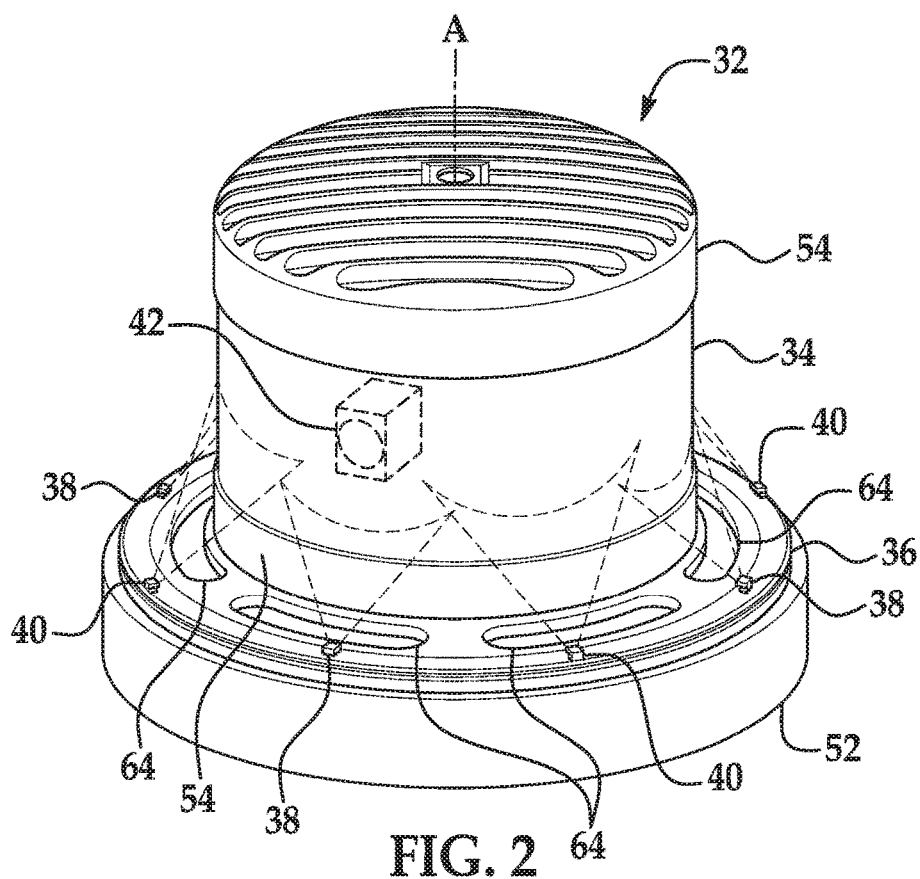
FIG. 2 is a perspective view of an example sensor apparatus of the vehicle.

With reference to FIG. 2, a base 52 may be mounted to the pod 50, as shown in FIG. 1, or to one of the body panels 46, 48, e.g., the roof 48. The base 52 may extend upwardly from the pod 50, as shown in FIG. 1, or be partially or fully recessed inside the pod 50. The base 52 has a cylindrical shape oriented vertically, i.e., defining the axis A that is substantially vertical.

A sensor housing 54 is mounted to the base 52. The sensor housing 54 supports the sensor 42, and the sensor housing 54 along with the sensor window 34 encloses the sensor 42 and protects the sensor 42 from the ambient environment. The sensor housing 54 may be cylindrical, oriented vertically, and substantially centered on the axis A.

The sensor 42 can detect the external world, e.g., objects and/or characteristics of surroundings of the vehicle 30, such as other vehicles, road lane markings, traffic lights and/or signs, pedestrians, etc. For example, the sensor 42 may be a radar sensor, scanning laser range finder, light detection and ranging (LIDAR) device, or image processing sensor such as a camera. In particular, the sensor 42 can be a LIDAR device. A LIDAR device detects distances to objects by emitting laser pulses and measuring the time of flight for the pulse to travel to the object and back. The sensor 42 is mounted to the sensor housing 54 and disposed inside the sensor window 34 and sensor housing 54.

The sensor window 34 is cylindrical and hollow. The sensor window 34 is substantially centered on the base 52, i.e., the sensor window 34 defines the axis A. The sensor window 34 is mounted to the sensor housing 54. The sensor window 34 extends upward from the base 52 and the sensor housing 54. The sensor window 34 has an outer diameter less than an inner diameter of the annular member 36. The sensor window 34 is transparent at least to, i.e., allows to substantially pass, a wavelength of light emitted by the sensor 42. The sensor 42 has a 360° horizontal field of view through the sensor window 34.

The annular member 36 has a toroidal shape defining the axis A. The annular member 36 has a tubular shape extending along the toroidal shape.

The annular member 36 is fixed relative to the sensor window 34 and substantially centered on the axis A. For example, the annular member 36 is fixedly mounted to the base 52, and the sensor housing 54 and sensor window 34 are also fixedly mounted to the base 52. The annular member 36 is spaced from the sensor window 34 along the axis A; e.g., as shown in FIG. 2, the annular member 36 is disposed below a bottom of the sensor window 34. The annular member 36 is radially spaced from the sensor window 34; e.g., as shown in FIG. 2, the inner diameter of the annular member 36 is greater than an outer diameter of the sensor window 34.

Figure 3:
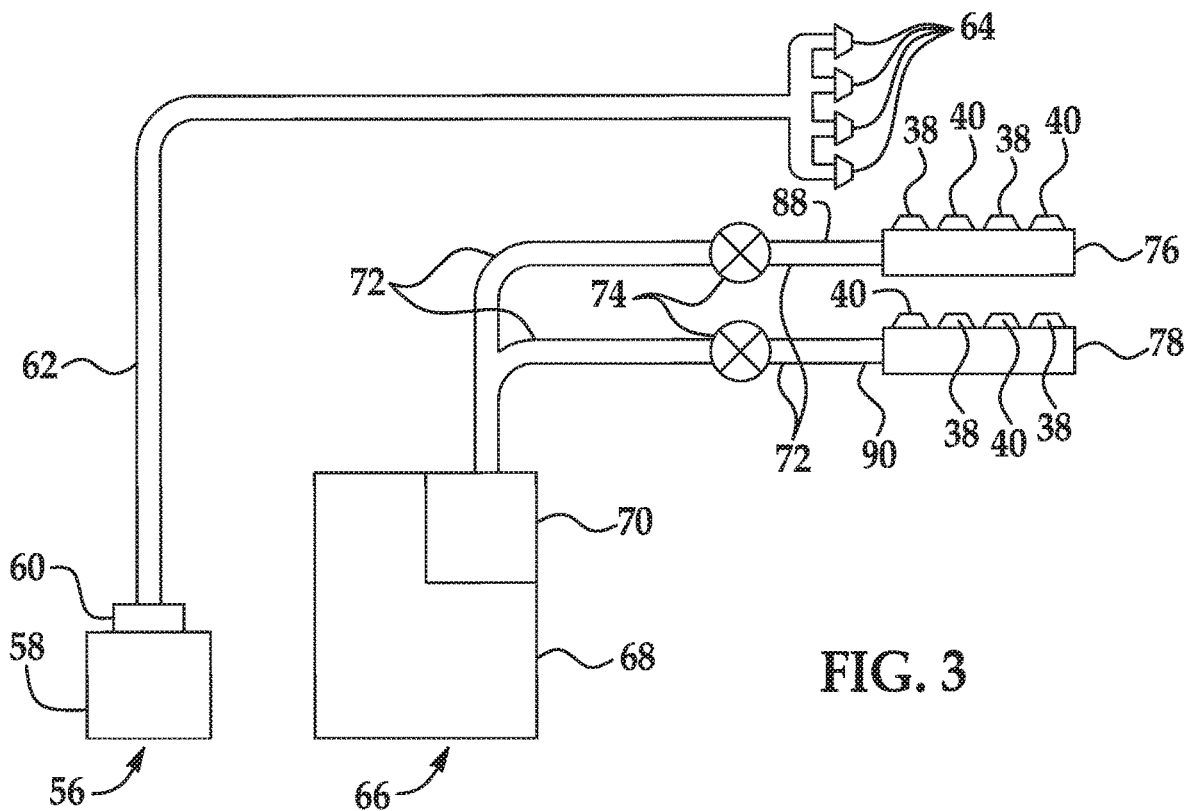
FIG. 3 is a diagram of an example sensor-cleaning system of the vehicle.

With reference to FIG. 3, an air cleaning system 56 includes a compressor 58, a filter 60, air supply lines 62, and air nozzles 64. The compressor 58, the filter 60, and the air nozzles 64 are fluidly connected to each other (i.e., fluid can flow from one to the other) in sequence through the air supply lines 62.

The compressor 58 increases the pressure of a gas by, e.g., forcing additional gas into a constant volume. The compressor 58 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The filter 60 removes solid particulates such as dust, pollen, mold, dust, and bacteria from air flowing through the filter 60. The filter 60 may be any suitable type of filter, e.g., paper, foam, cotton, stainless steel, oil bath, etc.

The air supply lines 62 extend from the compressor 58 to the filter 60 and from the filter 60 to the air nozzles 64. The air supply lines 62 may be, e.g., flexible tubes.

A liquid cleaning system 66 of the vehicle 30 includes a reservoir 68, a pump 70, liquid supply lines 72, valves 74, the first nozzles 38, and the second nozzles 40. The reservoir 68, the pump 70, the valves 74, and the first nozzles 38 and second nozzles 40 are fluidly connected to each other (i.e., fluid can flow from one to the other). The liquid cleaning system 66 distributes washer fluid stored in the reservoir 68 to the first nozzles 38 and second nozzles 40. "Washer fluid" refers to any liquid stored in the reservoir 68 for cleaning. The washer fluid may include solvents, detergents, diluents such as water, etc.

The reservoir 68 may be a tank fillable with liquid, e.g., washer fluid for window cleaning. The reservoir 68 may be disposed in a front of the vehicle 30, specifically, in an engine compartment forward of a passenger cabin. The reservoir 68 may store the washer fluid only for supplying the sensor apparatus 32 or also for other purposes, such as supply to the windshield.

The pump 70 may force the washer fluid through the liquid supply lines 72 to the valves 74 and then to the first nozzles 38 and second nozzles 40 with sufficient pressure that the washer fluid sprays from the first nozzles 38 and second nozzles 40. The pump 70 is fluidly connected to the reservoir 68. The pump 70 may be attached to or disposed in the reservoir 68.

The liquid supply lines 72 extend from the pump 70 to the valves 74 and from the valves 74 to the first nozzles 38 and second nozzles 40. The liquid supply lines 72 may be, e.g., flexible tubes.

The valves 74 are independently openable and closable, to permit the washer fluid to flow through or block the washer fluid; i.e., each valve 74 can be opened or closed with changing the status of the other valve 74. The valves 74 may be any suitable type of valve, e.g., ball valve, butterfly valve, choke valve, gate valve, globe valve, etc.

Figure 4:
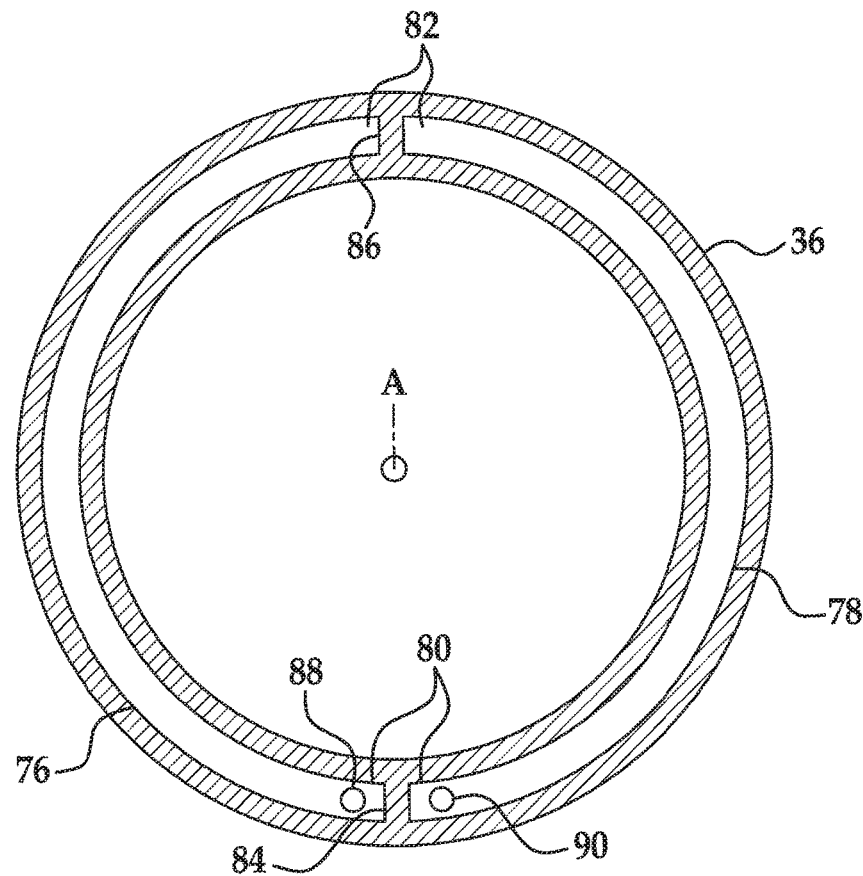
FIG. 4 is a cross-sectional view of an example annular member of the sensor apparatus.

With reference to FIG. 4, the annular member 36 includes a first cavity 76 and a second cavity 78. The first cavity 76 is elongated along a semicircular shape around the axis A extending through a first half of the annular member 36, and the second cavity 78 is elongated along a semicircular shape around the axis A extending through a second half of the annular member 36 that is nonoverlapping with the first half. The first cavity 76 and the second cavity 78 each extend from first ends 80 to second ends 82. The first ends 80 are adjacent to each other, and the second ends 82 are adjacent to each other. The first cavity 76 and the second cavity 78 are fluidly isolated from each other; i.e., the first cavity 76 and second cavity 78 are arranged such that fluid cannot flow from one to the other. For example, a first barrier 84 is disposed between the first ends 80, and a second barrier 86 is disposed between the second ends 82. The first barrier 84 and second barrier 86 prevent washer fluid from flowing between the first cavity 76 and the second cavity 78.

Figure 5:
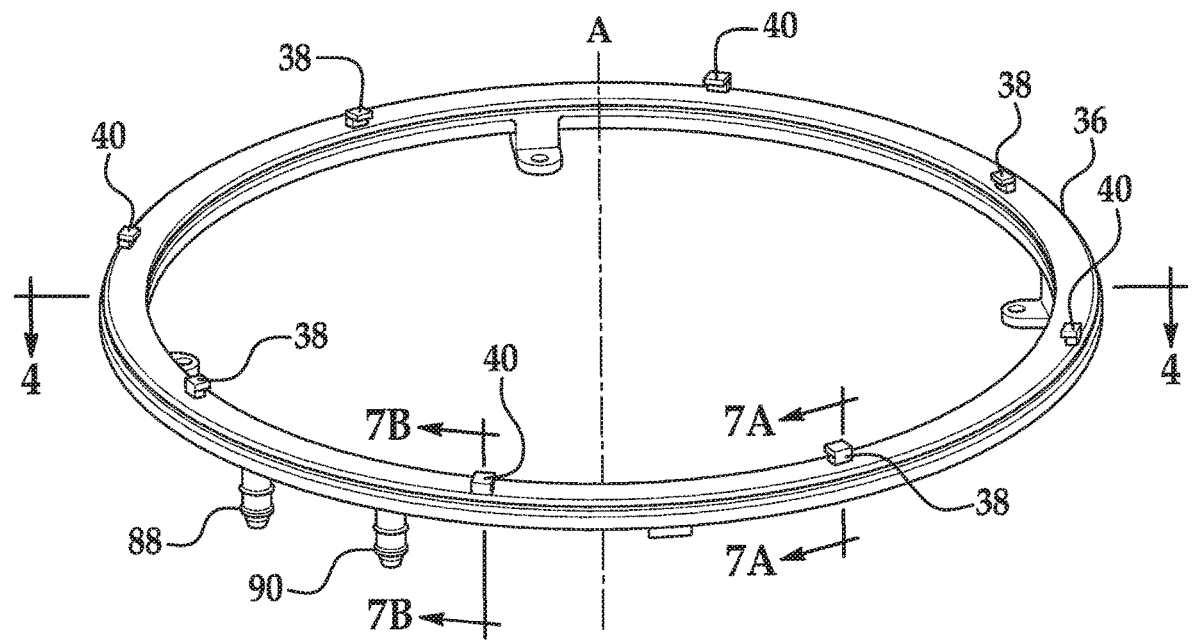
FIG. 5 is a perspective view of the annular member.

With reference to FIGS. 4 and 5, a first inlet 88 is fluidly connected to the first cavity 76, and a second inlet 90 is fluidly connected to the second cavity 78. The first inlet 88 is located at the first end 80 of the first cavity 76, and the second inlet 90 is located at the first end 80 of the second cavity 78. The first inlet 88 and the second inlet 90 connect to the annular member 36 from below the annular member 36.

Figure 6:
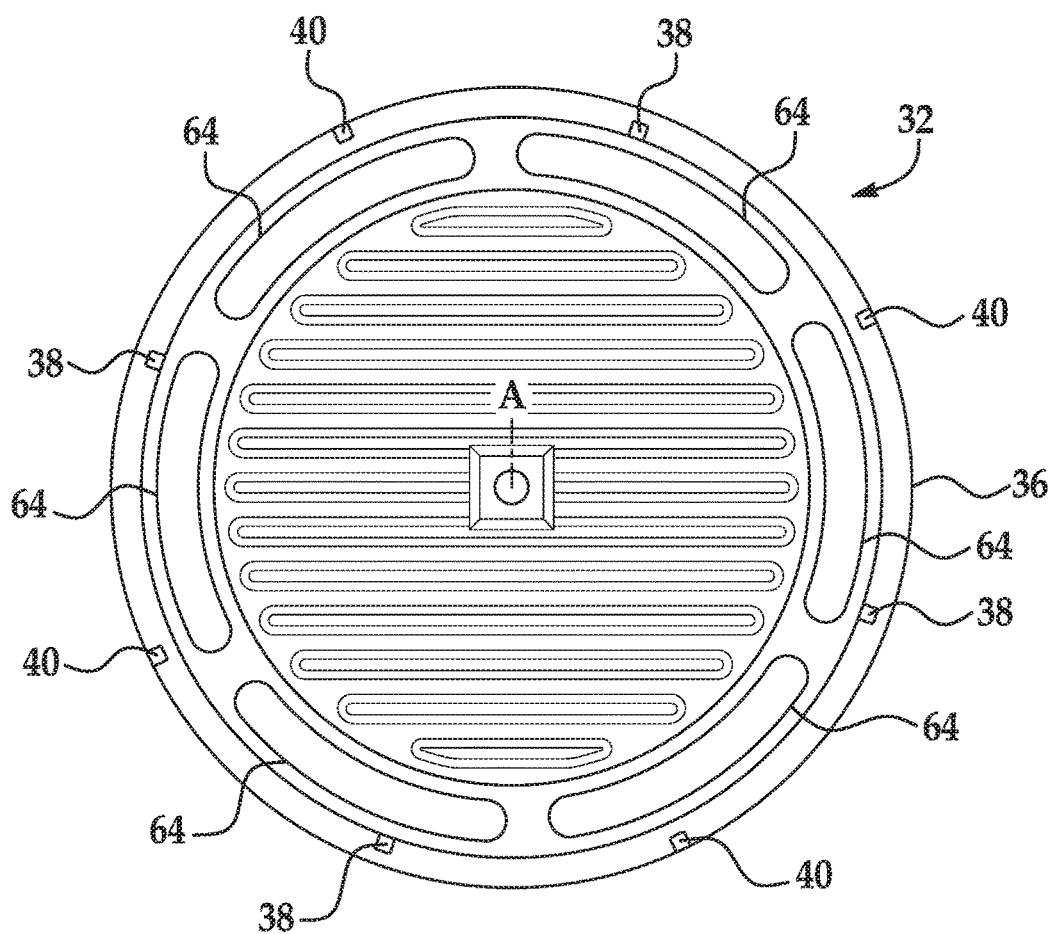
FIG. 6 is a top view of the sensor apparatus.

With reference to FIG. 6, the air nozzles 64 are positioned to discharge between the annular member 36 and the sensor window 34. The air nozzles 64 are positioned radially between the sensor window 34 and the annular member 36, i.e., farther from the axis A than the sensor window 34 and closer to the axis A than the annular member 36. The air nozzles 64 are oriented to discharge in a direction parallel to the axis A, e.g., vertically upward. The air nozzles 64 are positioned below the sensor window 34 and are arranged circumferentially around the sensor window 34.

The annular member 36 includes the first nozzles 38 and the second nozzles 40. The first nozzles 38 and the second nozzles 40 are arranged in an alternating pattern around the annular member 36; i.e., each first nozzle 38 is circumferentially adjacent to one second nozzle 40 in each direction, and each second nozzle 40 is circumferentially adjacent to one first nozzle 38 in each direction. The first nozzles 38 and second nozzles 40 are substantially evenly spaced around the annular member 36; i.e., the distance from each first or second nozzle 38, 40 to the adjacent first or second nozzle 38, 40 is substantially the same. The first nozzles 38 can include four first nozzles 38, and the second nozzles 40 can include four second nozzles 40.

The first cavity 76 is fluidly connected to a first set of the first nozzles 38 and second nozzles 40, and the second cavity 78 is fluidly connected to a second set of the first nozzles 38 and second nozzles 40. The first set of the first nozzles 38 and second nozzles 40 includes a first half of the first nozzles 38, e.g., two first nozzles 38, and a first half of the second nozzles 40, e.g., two second nozzles 40. The second set of the first nozzles 38 and second nozzles 40 includes a second half of the first nozzles 38, e.g., the other two first nozzles 38, and a second half of the second nozzles 40, e.g., the other two second nozzles 40.

Figure 7A:
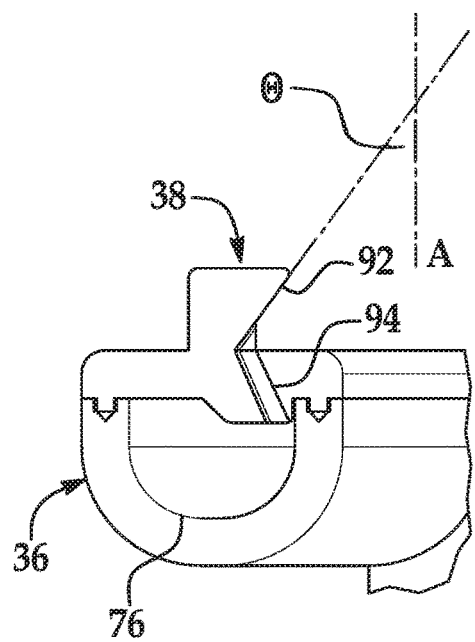
FIG. 7A is a cross-sectional view of an example first nozzle of the annular member.
Figure 7B:
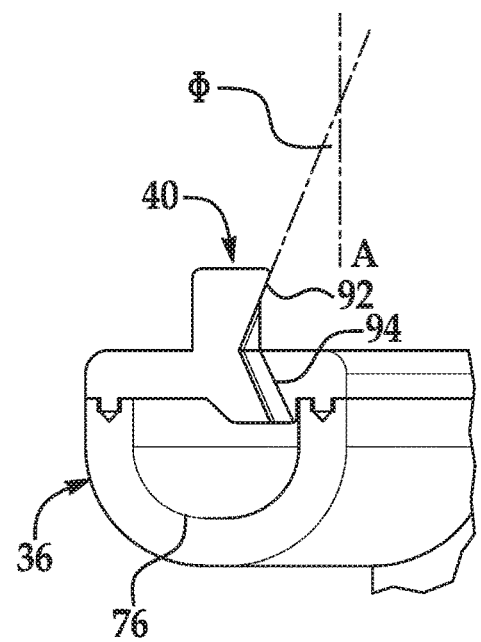
FIG. 7B is a cross-sectional view of an example second nozzle of the annular member.

With reference to FIGS. 7A-B, the first nozzles 38 and second nozzles 40 are liquid nozzles. The first nozzles 38 and second nozzles 40 are shaped to spray fluid in a flat-fan pattern, as shown in FIG. 2. The first nozzles 38 and second nozzles 40 each include a deflection surface 92, which is flat, and an outlet 94 directed at the respective deflection surface 92. Fluid exiting the first cavity 76 or second cavity 78 through one of the outlets 94 hits the respective deflection surface 92 and spreads out into the flat-fan pattern defined by the deflection surface 92.

The first nozzles 38 each have a direction of discharge in a radially inward and axial direction, i.e., a direction that is toward the axis A and along the axis A, forming the first angle θ with the axis A. The second nozzles 40 each have a direction of discharge in a radially inward and axial direction forming the second angle φ with the axis A. The second angle φ is different than the first angle θ. The deflection surfaces 92 of the first nozzles 38 each define the first angle θ with the axis A, and the deflection surfaces 92 of the second nozzles 40 each define the second angle φ with the axis A.

In operation, the liquid cleaning system 66 can be activated, e.g., when the sensor window 34 becomes dirty or obstructed, at regular intervals, or based on other triggers. The pump 70 forces washer fluid through the first inlet 88 to the first cavity 76 and through the second inlet 90 to the second cavity 78. The valves 74 can be activated so that washer fluid is pumped to only one of the first cavity 76 or the second cavity 78, e.g., if the obstruction on the sensor window 34 is on only one side. The washer fluid passing through the first nozzles 38 is directed at the sensor window 34 at the first angle θ, and the washer fluid passing through the second nozzles 40 is directed at the sensor window 34 at the second angle φ. The washer fluid from the second nozzles 40 lands on the sensor window 34 higher than the washer fluid from the first nozzles 38, providing good vertical coverage of the sensor window 34. The air cleaning system 56 can be activated, e.g., to dry the sensor window 34 after use of the liquid cleaning system 66.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A sensor apparatus comprising:
   a cylindrical sensor window defining an axis; and
   a tubular annular member fixed relative to the sensor window and substantially centered around the axis, the annular member including a plurality of first nozzles and second nozzles arranged in an alternating pattern around the annular member;
   wherein the first nozzles and the second nozzles discharge from a same plane, the plane being perpendicular to the axis;
   the first nozzles each have a direction of discharge in a radially inward and axial direction forming a first angle with the axis; and
   the second nozzles each have a direction of discharge in a radially inward and axial direction forming a second angle with the axis, the second angle being different than the first angle.

2. The sensor apparatus of claim 1, wherein the annular member is spaced from the sensor window along the axis.

3. The sensor apparatus of claim 1, wherein the first and second nozzles are substantially evenly spaced around the annular member.

4. The sensor apparatus of claim 1, wherein the first and second nozzles are shaped to spray fluid in a flat-fan pattern.

5. The sensor apparatus of claim 1, further comprising a sensor housing to which the sensor window is mounted, and a base to which the sensor housing and the annular member are mounted.

6. The sensor apparatus of claim 1, wherein the plurality of first nozzles includes four first nozzles, and the plurality of second nozzles includes four second nozzles.

7. The sensor apparatus of claim 1, wherein each first nozzle and second nozzle are at a respective circumferential position, and each circumferential position has only the respective first or second nozzle as a nozzle.

8. The sensor apparatus of claim 1, wherein the first and second nozzles each include a flat deflection surface and an outlet directed at the respective deflection surface.

9. The sensor apparatus of claim 8, wherein the deflection surfaces of the first nozzles each define the first angle with the axis, and the deflection surfaces of the second nozzles each define the second angle with the axis.

10. The sensor apparatus of claim 1, wherein each first nozzle and each second nozzle is aimed at the sensor window.

11. The sensor apparatus of claim 10, wherein the first and second nozzles are liquid nozzles, the sensor apparatus further comprising air nozzles positioned to discharge through a space that is radially outside the sensor window, radially inside the annular member, and axially below the sensor window.

12. The sensor apparatus of claim 1, wherein the annular member is radially spaced from the sensor window.

13. The sensor apparatus of claim 12, wherein the first and second nozzles are liquid nozzles, the sensor apparatus further comprising air nozzles positioned to discharge between the annular member and the sensor window.

14. The sensor apparatus of claim 13, wherein the air nozzles are oriented to discharge in a direction parallel to the axis.

15. The sensor apparatus of claim 1, wherein the annular member includes a first cavity fluidly connected to a first set of the first and second nozzles, and a second cavity fluidly connected to a second set of the first and second nozzles.

16. The sensor apparatus of claim 15, wherein the first cavity and the second cavity are fluidly isolated from each other.

17. The sensor apparatus of claim 15, wherein the first cavity is elongated along a semicircular shape around the axis extending through a first half of the annular member, and the second cavity is elongated along a semicircular shape around the axis extending through a second half of the annular member that is nonoverlapping with the first half.

18. The sensor apparatus of claim 15, wherein the first set of the first and second nozzles includes a first half of the first nozzles and a first half of the second nozzles, and the second set of the first and second nozzles includes a second half of the first nozzles and a second half of the second nozzles.

19. The sensor apparatus of claim 15, further comprising a first inlet fluidly connected to the first cavity and a second inlet fluidly connected to the second cavity.

20. The sensor apparatus of claim 19, wherein the first cavity and the second cavity each extend from first ends adjacent to each other to second ends adjacent to each other, and the first inlet is located at the first end of the first cavity, and the second inlet is located at the first end of the second cavity.

* * * * *